Patented Jan. 12, 1954

2,666,084

UNITED STATES PATENT OFFICE 2,666,084

PRODUCTION OF PRIMARY HALIDES

Kenneth D. Detling, Horace S. Knight, and George T. Williamson, Berkeley, Calif., assignors to Shell Development Company, San Francisco, Calif., a corporation of Delaware No Drawing. Application October 16, 1950,
Serial No. 190,434

9 Claims. (Cl. 260—648)

This invention relates to the production of primary halides from olefinic hydrocarbons and deals particularly with an efficient and economical method for producing halogenated hydrocarbons of six or more carbon atoms per molecule, having a halogen atom attached to a terminal carbon atom. In one of its more important modifications the invention is concerned with the synthesis of higher alkyl primary halides from tertiary olefins.

While a great many methods are available for the production of halogenated hydrocarbons, none is entirely satisfactory for the manufacture of higher primary halides either because they require expensive starting materials, or give mixed products, or are of limited applicability, or for other reasons. Thus, primary alcohols may be efficiently converted to the corresponding halides but the cost of the starting alcohol makes this method unattractive. Higher alkyl primary bromides may be produced by the peroxide-induced abnormal addition of hydrogen bromide to terminally unsaturated olefins, but the production of the more generally desirable chlorides by this process has not been successful. Telomerization of olefinic compounds with hydrogen chloride can be used to obtain higher primary halides but, as pointed out in U. S. Patent 2,440,801, a mixture of products of different molecular weights is always obtained by this method.

It is an object of the present invention to overcome the foregoing and other disadvantages of prior methods of manufacturing primary halides having six or more carbon atoms per molecule. An important object is to produce such halides from relatively inexpensive starting materials. Still another object is to provide a process whereby higher alkyl primary halides, which can serve as an economically satisfactory source of the corresponding alcohols, may be produced. Still other objects and advantages of the process of the invention will be apparent from the following discussion of some of its more important modifications which will be understood as not being limitative of the broad scope of the invention as defined in the appended claims.

It has now been found that higher primary halides can be successfully manufactured by reacting together a tertiary unsaturated olefinic hydrocarbon, ethylene and hydrogen halide in the presence of a Friedel-Crafts type catalyst. The halide formed contains two more carbon atoms than the starting tertiary unsaturated olefinic hydrocarbon and has the halogen atom of the hydrogen halide attached to the terminal carbon atom of an ethyl radical linked to a tertiary unsaturated carbon atom of the starting tertiary olefinic hydrocarbon. The reaction, when using a tertiary olefinic hydrocargon having only one tertiary unsaturated carbon atom in the molecule, may thus be represented by the following equation:

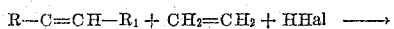
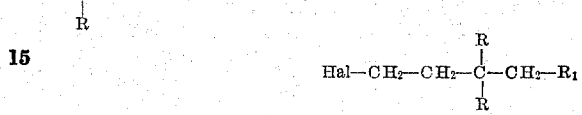

where the R's represent hydrocarbon radicals, $R_1$ represents hydrogen or a hydrocarbon radical, and the two R's together or either of them with $R_1$ represent a divalent hydrocarbon radical which does not form an aromatic ring in which the unsaturated carbon atoms shown in the starting olefinic hydrocarbon are included. In this equation Hal represents a halogen atom which can be fluorine, chlorine, bromine or iodine. When the starting tertiary olefinic hydrocarbon contains two tertiary unsaturated carbon atoms in its molecule, i. e. has the structure

where R and $R_2$ are the same or different hydrocarbon radicals, any pair of which may represent a divalent hydrocarbon radical as pointed out above, the product will be a single compound or a mixture of two isomers depending upon whether the starting olefinic hydrocarbon is a symmetrical or an unsymmetrical compound. Thus, for example, when all the R's and $R_2$ represent the same hydrocarbon radical, i. e. $R_2$ is the same as R, the single product has the formula

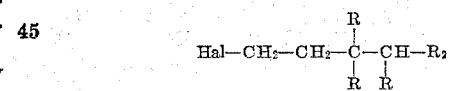

However, when, for instance $R_2$ represents a hydrocarbon radical different from any of those represented by R so that the starting olefinic hydrocarbon is unsymmetrical, the product is a mixture of the two isomers

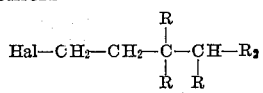

and

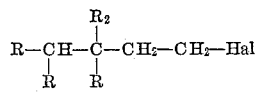

This is a reaction which would not be expected from the usual behavior of the olefinic hydrocarbons involved. The great polymerization tendency of tertiary olefins in the presence of Friedel-Crafts catalysts might lead to the expectation that it might copolymerize with ethylene, but the polymer produced in such a case would be tertiary olefin which would not yield a primary halide by any known mechanism of hydrogen halide addition. The reaction is likewise distinguished from telomerizations not only in regard to the nature of the product which is obtained but also in respect to the character of the catalysts which are used in the new procedure.

In carrying out the process of the invention a wide variety of different tertiary unsaturated hydrocarbons and reaction conditions may be used. For most efficient operation, however, it is desirable to control the reaction conditions in accordance with the activities of the particular tertiary unsaturated hydrocarbon, Friedel-Crafts catalyst and hydrogen halide which are chosen, so as to minimize the undesirable side reactions to which the process is subject. Among these side reactions are, for instance, polymerization of the starting olefins, and addition of hydrogen halide to the olefins. The use of low temperatures and regulation of the proportions of the reactants and catalysts are effective means of reducing undesired side reactions. A low partial pressure of hydrogen halide and ethylene in the reaction zone is generally advantageous in reducing the formation of lower alkyl halides. In addition, any ethyl halide and/or tertiary halide formed may be recovered from the product and recycled to the reaction as an aid in suppressing further formation of these halides.

As catalysts for the reaction, Friedel-Crafts type metal halides, such as aluminum chloride, aluminum bromide, ferric chloride, titanium tetrachloride, stannous) or stannic chloride, bismuth chloride and the like, are used. The catalyst may be used in solid form as lumps or granules, or finely divided powders, or may be deposited on supports or carriers which may be inert or may have an advantageous influence on the reaction. United States Patent 2,295,977, for example, describes a method suitable for the preparation of such supported catalysts. Catalysts in the liquid state offer many advantages in the process. Friedel-Crafts type catalysts such as the aluminum halides may be used in this form by converting them to organic complexes. Organic complexes of active metal halides and ketones, such as described in United States Patent 2,085,535, or metal halide-alkyl halide complexes, such as may be prepared by refluxing a tertiary alkyl halide with the corresponding aluminum halide, may be employed. Other suitable complex catalysts are those formed by the union of active metal halides with hydrocarbons, which may be either aliphatic or aromatic, or mixtures of hydrocarbons. The catalysts claimed in United States Patent 2,306,261, for example, may be used. Double salts of aluminum chloride, such as are described in United States Patent 2,076,201, are also useful in the process. Complexes or sludges formed in the course of the reaction may, after addition of fresh metal halide, be used as the catalyst.

Any suitable method of contacting the reactants with the catalyst under reaction conditions may be employed. For instance, in batch operation under liquid phase conditions with liquid or suspended catalyst, good results have been obtained by introducing the catalyst as a slurry in the tertiary olefin feed which is charged to an autoclave and agitated thoroughly during addition of the ethylene and hydrogen halide in anhydrous form. Continuous or intermittent reaction can be carried out by countercurrent or concurrent contact of the reactants with the catalyst in suitable towers or other mixing devices. Instead of operating with all the reactants in the liquid phase, gas phase or mixed phase reaction conditions may be used. An especially advantageous method for carrying out the process continuously comprises feeding ethylene, a tertiary olefin preferably mixed with a suitable diluent, hydrogen chloride and an aluminum chloride-hydrocarbon complex into a mixer from which the reacted mixture can overflow into a separator where the catalyst is separated from the organic layer which is processed for recovery of the product in any suitable way.

Whatever the method of operation adopted in carrying out the new reaction, it is desirable to maintain a low partial pressure of ethylene and hydrogen chloride in the reaction mixture. Suitable proportions for the reactants are usually within the range of about 0.5 to 2 moles of tertiary olefin and 0.5 to 1.5 moles of ethylene per mole of hydrogen halide in the feed. Most preferably, a molecular excess of the more reactive tertiary olefin, based on the ethylene present, is used. The temperature, pressure and space velocity which will be most desirable will depend upon the particular Friedel-Crafts metal halide catalyst chosen and the tertiary olefin and hydrogen halide chosen, as well as on the method of reaction adopted. As a general rule, it is desirable to carry out the reaction at as low a temperature as is consistent with economical conversions since side reactions can be minimized in this way. With aluminum chloride catalyst, whether used as such or in the form of its organic complexes, it has been found that temperatures below 30° C. are preferable when hydrogen chloride is the hydrogen halide employed and, more advantageously, temperatures between about −20° C. and +20° C. are used. Less active catalysts require higher temperatures, but in all cases it is desirable to maintain the temperature below 100° C. The reaction can be carried out at atmospheric pressure, but it is usually preferable to employ superatmospheric pressures, and pressures of the order of about 25 to 600 pounds per square inch, gage, have been used successfully. The conditions are preferably adjusted so as to minimize polymerization of the tertiary olefinic hydrocarbon and/or its copolymerization with the ethylene. To this end, the use of diluents, such, for example, as saturated hydrocarbons, preferably having a boiling point or range which facilitates their separation from the reaction products, is advantageous.

The amount of Friedel-Crafts type metal halide catalyst which is desirable varies with the activity of the catalyst used. Highly active catalysts such as aluminum chloride or aluminum bromide are effective in relatively small amounts and too great an excess may lead to side reactions. As a rule, amounts of the order of about 0.2% to 2.0% by weight of the olefinic reactants are suitable. This weight of catalyst is based upon its metal halide content. Thus, when using aluminum chloride, for instance, in the form of an organic complex containing about 40% to 80% by weight of metal chloride, as is preferred, about 0.25% to 6.0% of the complex would be used. The catalyst may be repeatedly recycled to the reaction after separation so that its consumption in the process is usually quite low.

It is usually desirable to use as the catalyst a Friedel-Crafts metal halide corresponding to the hydrogen halide employed in the reaction. For the production of primary chlorides, for example, a metal chloride such as aluminum chloride is preferred, while aluminum bromide is used when reacting with hydrogen bromide.

The following is a more detailed description of two typical methods of carrying out the new reaction as applied to the manufacture of primary alkyl chlorides.

*Example I*

For continuous reaction a turbo-mixer of 1121 cc. capacity having internal cooling coils is a convenient form of reactor. The ethylene and tertiary olefin feed streams are cooled separately in jacketed vessels by indirect heat exchange with refrigerated acetone. A liquid hydrocarbon diluent such, advantageously, as n-pentane is useful and is fed along with the ethylene. To insure thorough mixing of the ethylene with the other components before contact with the catalyst, the total feed mixture is passed through a vessel tightly packed with glass wool. The catalyst, an aluminum chloride complex prepared by refluxing an excess of technical grade kerosene with powdered anhydrous aluminum chloride in the presence of a slow stream of hydrogen chloride with stirring until all the aluminum chloride was converted to a dark reddish-brown fluid complex having a specific gravity of 1.27 and analyzing 8.65% by weight of aluminum, corresponding to an aluminum chloride content of about 43%, is fed from a steel pressure vessel from which it is displaced by pumping in kerosene and charged to the reactor through a separate tube entering at the center of the face plate of the mixer. The reaction mixture flows from the turbo-mixer reactor into a separator where the catalyst settles out and is drained off continuously or periodically, while the product layer is withdrawn, depressured and water-washed in a high-speed centrifugal pump to decompose any last traces of catalyst. The effluent is discharged into a vessel where phase separation takes place, the gases being separated, the water layer drawn off and the organic liquid layer collected and distilled at reduced pressure for recovery of the product.

In this method of operation representative conditions of reaction with different feed stocks are, for instance:

| Tertiary olefin | Isobutylene | Propylene polymers (boiling range, 75°–95° C.; Br. No. 158; olefin content about 89% by volume) |
|---|---|---|
| Mole feed ratio of ethylene to tertiary olefin | 1:1 | 1:1 |
| HCl to tertiary olefin (mol ratio) | 1.1:1 | 1.1:1 |
| Catalyst (weight percent of olefin feed) | 6.0 | 3.0 |
| Temperature °C | −10 | −10 |
| Pressure (p. s. i. g.) | 200 | 150 |
| Contact time min | 6 | 10 |
| Diluent (n-pentane) in reaction mixture percent | 50 | 33 |

Under these reaction conditions, typical results would be as follows:

| Tertiary olefin | Isobutylene | Propylene polymers (boiling 75°–95° C.) |
|---|---|---|
| Chloride produced | 1-chloro-3,3-dimethylbutane | Primary alkyl chlorides: Decyl chloride 20.4% Octyl and nonyl chlorides 79.6% (Higher boiling material in the depentanized product 14%.) |
| Yield of primary chlorides: | | |
| On ethylene reacted | 32 percent | 60 percent. |
| On tertiary olefin reacted | 48 percent | 52 percent. |

*Example II*

In batch operation a mild steel autoclave (5 liter capacity) provided with cooling coils and an efficient agitator is suitable. The aluminum chloride-kerosene complex catalyst is first charged to the autoclave with or without a diluent. The agitator is then started up and the tertiary olefin and hydrogen chloride run in, followed by addition of the ethylene in proper proportions. On completion of the reaction, the agitation is stopped, the mixture depressurized and settled, and the lower catalyst-containing layer drawn off from the upper product-containing layer. Water is then run in and the agitator started up to thoroughly wash the product and decompose any remaining traces of catalyst. After again settling the mixture, the water layer is drawn off and the product layer withdrawn for distillation as above.

Representative operating conditions for this method of batch operation are:

| Tertiary olefin | Tertiary amylenes (88–89% olefins in C₅ fraction containing 98% total olefins) | Methylcyclohexene-1 |
|---|---|---|
| Mole ratio, ethylene to tertiary olefins | 1:1 | 1:1. |
| HCl to tertiary olefin (mol ratio) | 1.1:1 | 1.1:1. |
| Catalyst (aluminum chloride-kerosene sludge containing 25 grams added AlCl₃/100 ml.) ml | 200 | 200. |
| Temperature °C | 0 | −5. |
| Pressure p. s. i. g | 90 | 100. |
| Reaction time min | 85 | 20. |
| Diluent | None | 33% n-pentane. |
| Product | (¹) | 1-chloro-2-cyclohexylethane. |
| Yield, based on: | | |
| Ethylene reacted percent | | 40. |
| Tertiary olefin reacted do | 35 | 55 |

[1] Primary heptyl chloride (boiling 66°–68° C. at 50 mm.)

In other examples of the new reaction, di-isobutylene, ethylene and hydrogen chloride under similar conditions give as the main reaction product 1-chloro-3,3,5,5-tetramethylhexane, and 2,3-dimethylbutene-2, ethylene and hydrogen chloride produce under such conditions 1-chloro-3,3,4-trimethylpentane. These illustrative examples are not limiting since the process of the invention is applicable to tertiary unsaturated olefinic hydrocarbons as a class, those having 4 to 24 carbon atoms per molecule being a particularly useful subgroup. Thus, while olefin polymers having a tertiary unsaturated carbon atom are an especially convenient, readily available, starting material for use in the process, other tertiary olefins, both open chain and alicyclic, may be similarly used. Aromatic hydrocarbon radicals may be present as substituents of the tertiary olefin used. Thus, for example, the reaction of alpha-methylstyrene, ethylene and hydrogen chloride gives good yields of 1-chloro-3,3-dimethyl-3-phenylpropane.

While the production of primary chlorides has been emphasized in the foregoing examples, the reaction can be carried out equally satisfactorily by using hydrogen fluoride, hydrogen bromide or hydrogen iodide in place of the hydrogen chloride. Still other modifications in the process can be made without departing from the invention which is broadly applicable to the production of primary halides by reaction of any tertiary unsaturated olefinic hydrocarbon, or mixtures thereof, with any of the hydrogen halides in the presence of a metal halide catalyst of the Friedel-Crafts type.

We claim as our invention:

1. A process of producing a primary halide which comprises reacting together a tertiary unsaturated olefinic hydrocarbon, ethylene and a hydrogen halide in the proportions of 0.5 to 2 moles of tertiary olefinic hydrocarbon and 0.5 to 1.5 moles of ethylene per mole of hydrogen halide in the presence of an aluminum chloride catalyst at a temperature below 30° C. to effect combination of said reactants and produce a primary halide having two more carbon atoms per molecule than said tertiary unsaturated olefinic hydrocarbon.

2. A process of producing a primary chloride which comprises reacting together a tertiary unsaturated olefinic hydrocarbon, ethylene and hydrogen chloride in the proportions of 0.5 to 2 moles of said tertiary olefinic hydrocarbon and 0.5 to 1.5 moles of ethylene per mole of hydrogen chloride in the presence of an aluminum chloride catalyst at a temperature below 30° C. to effect combination of said reactants and produce a primary chloride having two more carbon atoms per molecule than said tertiary unsaturated olefinic hydrocarbon.

3. A process of producing a primary alkyl halide which comprises reacting a tertiary olefin, ethylene and a hydrogen halide in the proportions of 0.5 to 2 moles of tertiary olefinic hydrocarbon and 0.5 to 1.5 moles of ethylene per mole of hydrogen halide in the presence of a catalyst of the group consisting of free aluminum chloride and complexes of aluminum chloride with hydrocarbons and with alkyl halides at a temperature below 30° C. to effect combination of said reactants and produce an alkyl halide having two more carbon atoms than said tertiary olefin and a haloethyl radical attached to the tertiary carbon atoms of said tertiary olefin.

4. A process of producing a primary alkyl chloride which comprises reacting a tertiary olefin, ethylene and hydrogen chloride in the proportions of 0.5 to 2 moles of said tertiary olefin and 0.5 to 1.5 moles of ethylene per mole of hydrogen chloride in the presence of a catalyst of the group consisting of free aluminum chloride and complexes of aluminum chloride with hydrocarbons and with alkyl halides at a temperature below 30° C. to effect combination of said reactants and produce a primary alkyl chloride having two more carbon atoms than said tertiary olefin and a chloro-ethyl radical directly attached to the tertiary carbon atom of said tertiary olefin.

5. A process of producing a primary alkyl chloride which comprises reacting a tertiary olefin, ethylene and hydrogen chloride in the proportions of 0.5 to 2 moles of said tertiary olefin and 0.5 to 1.5 moles of ethylene per mole of hydrogen chloride in the presence of an aluminum chloride catalyst at a temperature below 30° C., separating from the reaction products a primary alkyl chloride having a chloro-ethyl radical directly attached to the tertiary carbon atom of said tertiary olefin, and returning to the reaction lower boiling alkyl chloride also formed in the process.

6. A process of producing a primary alkyl chloride which comprises reacting an olefin polymer of six to sixteen carbon atoms per molecule having a tertiary unsaturated carbon atom with ethylene and hydrogen chloride in the proportions of 0.5 to 2 moles of said polymer and 0.5 to 1.5 moles of ethylene per mole of hydrogen chloride in the presence of an aluminum chloride-kerosene complex catalyst at a temperature of not more than 30° C. to produce a primary alkyl chloride having two more carbon atoms per molecule than said olefin polymer.

7. A process of producing a primary alkyl chloride which comprises reacting a tertiary olefin, ethylene and hydrogen chloride in the proportions of 0.5 to 2 moles of said tertiary olefin and 0.5 to 1.5 moles of ethylene per mole of hydrogen chloride at a temperature below 30° C. in the presence of about 0.25 to 6.0% of an aluminum chloride-hydrocarbon complex catalyst containing 40% to 80% by weight of aluminum chloride to produce a primary alkyl chloride having two more carbon atoms per molecule than said tertiary olefin.

8. A process of producing a primary chloride which comprises reacting a tertiary cyclo-olefin, ethylene and hydrogen chloride in the proportions of 0.5 to 2 moles of said cyclo-olefin and 0.5 to 1.5 moles of ethylene per mole of hydrogen chloride in the presence of aluminum chloride at a temperature below 30° C. to produce a primary chloride having a chloro-ethyl radical directly attached to the tertiary carbon atom of said cyclo-olefin.

9. A process of producing a primary chloro-ethyl alkyl cyclohexane which comprises reacting an alkyl cyclohexene having a tertiary unsaturated carbon atom, ethylene and hydrogen chloride in the proportions of 0.5 to 2 moles of said cyclo-olefin and 0.5 to 1.5 moles of ethylene per mole of hydrogen chloride in the presence of aluminum chloride at a temperature below 30° C.

KENNETH D. DETLING.
HORACE S. KNIGHT.
GEORGE T. WILLIAMSON.

References Cited in the file of this patent

UNITED STATES PATENTS

| Number | Name | Date |
|---|---|---|
| 1,985,457 | Nutting et al. | Dec. 25, 1934 |
| 2,103,692 | Piotrowski et al. | Dec. 28, 1937 |
| 2,328,275 | Heard | Aug. 31, 1943 |
| 2,418,093 | Perkins et al. | Mar. 25, 1947 |
| 2,434,289 | Schmerling | Jan. 13, 1948 |